US012706945B2

(12) United States Patent
Sheedy et al.

(10) Patent No.: US 12,706,945 B2
(45) **Date of Patent: *Aug. 11, 2026**

(54) NETWORK ENVIRONMENT CONTROL SCANNING ENGINE

(71) Applicant: Bank of America Corporation, Charlotte, NC (US)

(72) Inventors: Jonathan Sheedy, Poynton (GB); Steven E. Sinks, Scottsdale, AZ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/963,027

(22) Filed: Nov. 27, 2024

(65) Prior Publication Data

US 2025/0097256 A1 Mar. 20, 2025

Related U.S. Application Data

(63) Continuation of application No. 17/001,288, filed on Aug. 24, 2020, now Pat. No. 12,238,135.

(51) Int. Cl.

| | |
|---|---|
| ***H04L 29/06*** | (2006.01) |
| ***G06F 16/903*** | (2019.01) |
| ***G06N 20/00*** | (2019.01) |
| ***H04L 9/40*** | (2022.01) |
| ***H04L 51/08*** | (2022.01) |
| ***H04L 51/212*** | (2022.01) |

(52) U.S. Cl.

CPC .... *H04L 63/1441* (2013.01); *G06F 16/90344* (2019.01); *G06N 20/00* (2019.01); *H04L 51/08* (2013.01); *H04L 51/212* (2022.05); *H04L 63/1433* (2013.01)

(58) Field of Classification Search

CPC ... H04L 63/1441; H04L 51/08; H04L 51/212; H04L 63/1433; H04L 63/1416; H04L 63/145; G06F 16/90344; G06F 21/561; G06F 21/577; G06N 20/00

See application file for complete search history.

(56) References Cited

U.S. PATENT DOCUMENTS 7,461,403 B1 12/2008 Libenzi et al.
7,565,693 B2 7/2009 Shin et al.

(Continued)

*Primary Examiner* — Harunur Rashid
(74) *Attorney, Agent, or Firm* — Banner & Witcoff, Ltd.

(57) ABSTRACT

A network environment scanning engine may monitor electronic communications received via an external computing network and by an enterprise computing system. The network environment canning engine after receipt of an electronic message, analyze the electronic message to identify, by a network environment scanning engine using a machine learning algorithm, executable code for execution by a processor of computing device addressed as a recipient of the message. The network environment scanning engine further analyzes, using a machine-learning based algorithm in a virtual security environment, the executable code to identify whether the executable code comprises one or more environment variables. Based on the analysis of the executable code, the network environment scanning engine either triggers, based on identification of the one or more environment variables and by an electronic messaging system, an alert sent via a communication network or releases the electronic message for delivery to the recipient computing device.

14 Claims, 4 Drawing Sheets

(56) References Cited

U.S. PATENT DOCUMENTS 8,397,276 B2 3/2013 March et al.
8,566,936 B2 10/2013 Chesla
8,914,882 B2 12/2014 McDougal et al.
9,419,995 B2 8/2016 Chow et al.
9,727,534 B1 * 8/2017 Buddhiraja ......... H04L 63/1441
9,838,408 B1 12/2017 Karandikar et al.
10,165,000 B1 12/2018 Aziz et al.
10,282,544 B2 5/2019 Brand et al.
10,284,574 B1 5/2019 Aziz et al.
10,333,961 B2 6/2019 Chen
10,474,818 B1 11/2019 Saxe
11,102,244 B1 * 8/2021 Jakobsson ............... H04L 51/42
11,392,697 B2 * 7/2022 Gauthier .................. G06N 5/04
2007/0038702 A1 * 2/2007 Taylor .................. G06Q 10/107 709/206
2007/0089171 A1 * 4/2007 Aharon ................... G06F 21/55 726/22
2010/0088386 A1 * 4/2010 Daniell ................ G06Q 10/107 709/206
2012/0151584 A1 6/2012 Kim et al.
2014/0317745 A1 * 10/2014 Kolbitsch ............. G06F 21/566 726/24
2017/0214701 A1 7/2017 Hasan
2018/0314619 A1 11/2018 Jagadeesan et al.
2019/0080089 A1 3/2019 Chen
2020/0004936 A1 * 1/2020 Avital ..................... G06F 21/31
2021/0058412 A1 * 2/2021 Rowland ............. H04L 63/1416
2021/0081531 A1 3/2021 Seo et al.
2021/0326434 A1 * 10/2021 Albero .................. G06F 16/258

* cited by examiner

NETWORK ENVIRONMENT CONTROL SCANNING ENGINE

CROSS REFERENCE TO RELATED APPLICATIONS

This application is a continuation of and claims priority to U.S. application Ser. No. 17/001,288 entitled Network Environment Control Scanning Engine filed on Aug. 24, 2020, which is incorporated by reference in its entirety.

BACKGROUND

Aspects of the disclosure relate to processes, machines, and platforms for information security and, in particular, to monitoring and scanning of software or data, to identify, using machine learning based and/or big data mining algorithms, attempted network intrusions environmental control checks used to bypass network security measures.

Enterprise computing systems (e.g., educational institution computing systems, corporate computing systems, financial institution computing systems, government computing systems and the like) may be constantly bombarded with data, both legitimate and illegitimate. In some cases, unauthorized individuals and/or threat actors may attempt to gain access into the enterprise computing system from any number of external sources, such as via email attachments, web browser provided links, and the like. A problem encountered with currently available malware and/or virus prevention applications often involves determining whether software, code snippets, links and the like are legitimate or not. In some cases, providers of such software packages may open attachments up in virtual environments to determine whether the code in question is legitimate by determining how the code runs, performing heuristics against the code, and then, if it passes the checks, lets the code pass on into the computing environment of the enterprise computing network. In general, all checks performed by the malware and/or virus prevention applications are standard to all customers and cannot be customized based on parameters and/or network characteristics unique to individual customers. As such, threat actors may bypass such programs, in some cases, by simply coding in checks for publicly identifiable information tied to that particular enterprise (e.g., domain names) and/or coding checks to identify whether malicious code is being launched in a virtual or sandboxed environment and, if so, includes instructions to prevent the malicious code from running. Antivirus applications may analyze incoming code to look for patterns in a hash of a file and may then utilize heuristics to identify malware. However, threat actors may design their malicious code to bypass such antivirus applications by adapting or otherwise writing custom software to obfuscate a purpose of the code to camouflage commonly used calls and/or commands to not fit any of the standardized patterns in the antivirus application configuration file.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing a secure enterprise computing network. For example, aspects of the disclosure relate to cyber security for enterprise computing systems. One or more aspects of the disclosure relate to analysis of incoming files and/or links for executable code utilizing environment variables in an attempt to gain unauthorized access to an enterprise computing network.

A network environment scanning engine may monitor electronic communications received via an external computing network and by an enterprise computing system. The network environment scanning engine after receipt of an electronic message, analyze the electronic message to identify, by a network environment scanning engine using a machine learning algorithm, executable code for execution by a processor of computing device addressed as a recipient of the message. The network environment scanning engine further analyzes, using a machine-learning based algorithm in a virtual security environment, the executable code to identify whether the executable code comprises one or more environment variables. Based on the analysis of the executable code, the network environment scanning engine either triggers, based on identification of the one or more environment variables and by an electronic messaging system, an alert sent via a communication network or releases the electronic message for delivery to the recipient computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
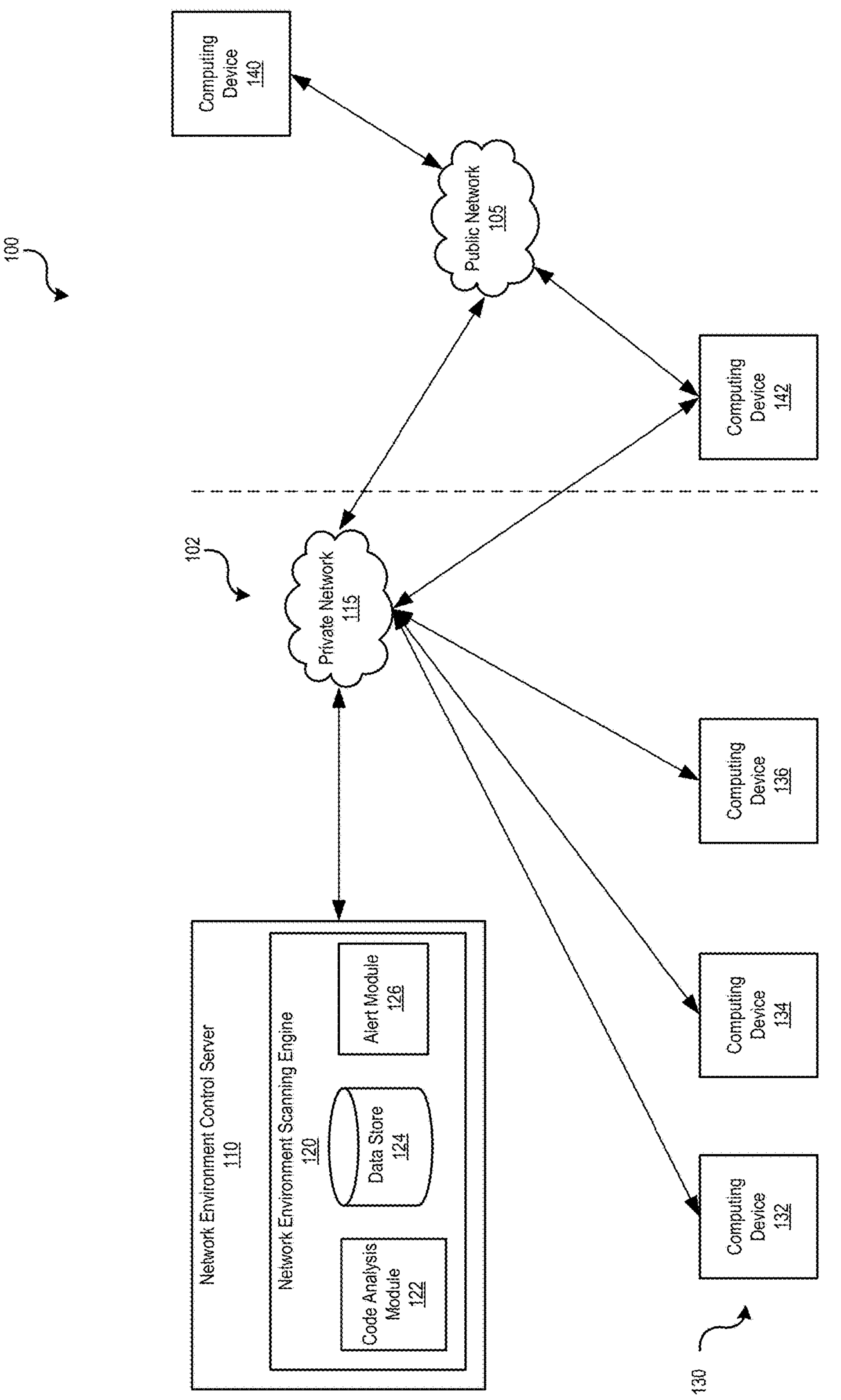
FIG. 1 shows an illustrative computing environment to secure a networked computing environment by preventing unauthorized use of environment variables in the networked computing environment in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Enterprise computer systems may be subject to a large number of data entry attacks, such as malware, computer viruses, worms, Trojan horses, ransomware, spyware, adware, scareware, phishing, fraud, and/or other potentially harmful schemes that may be either the same as or similar to data entry attacks being utilized by bad actors. In some cases, these data entry attacks may be initiated via executable code that may be accessed via a link or may be embedded in an attachment (e.g., documents, slide decks, spreadsheets, and the like). In some cases, the executable code may be benign and used to provide known and useful functionality that may be, for example, associated with a corresponding html page, document or other such file. However, in some cases, the executable code may be designed to perform some malicious activity to exploit a vulnerability of the enterprise network. In some cases, malicious code may be disguised as benign code and/or may be otherwise hidden so that when an application is launched, a webpage accessed, the malicious code may run in the background unnoticed until too late. In some cases, unauthorized individuals may attempt to bypass virus protection and/or malware prevention tools through use of environment variables. No current tools analyze environment variables that may be used to obfuscate malicious code and allow it to execute when not expected. While some virus protection and/or malware sensing applications may utilize a virtual or sandboxed environment to open files, access links, and/or test code received as an input to the computing system, such as via an attachment or through web links, these techniques can be bypassed, particularly if the virtual environment is not configured to resemble the enterprise network environment.

Enterprise computing systems are often complex, making recognition of legitimate network access difficult to determine what traffic should be let into the computing environment, and traffic that should be kept out. As mention, current providers of antivirus and/or malware prevention applications may utilize virtual environments to open attachments in an attempt to identify known methods of attack. For example, an attachment may be opened and checks may be made to analyze how any code is being run. Further, these applications may run heuristics against the code and, if it passes the checks, the antivirus or antimalware application may allow the analyzed software to be delivered to the recipient computing device in the enterprise computing environment. Here, all checks may be performed as a standard test provided to all users of the applications and may not be customized for each enterprise computing network to be protected. As such, bypassing this type of check may be done by coding in checks for publicly identifiable information tied to that institution such as, for example, domain names, email addresses, device naming conventions, or account naming conventions, and/or the like, or through inclusion of checks to determine whether the code is being executed in a virtual environment and, if so, programming an attached malware to run or not to run based on whether a virtual environment is recognized. In some cases, antivirus application may look for patterns in a hash of a file and may utilize heuristics to see if the hash matches with known threats to identify malware. However, such solutions may be bypassed by writing custom software and obfuscating the malicious code to make common calls that do not fit any known or standardized patterns that the antivirus software is configured to identify.

A need has been recognized for an application to gather institutional computing information (e.g., enterprise-specific environment variables) about an enterprise computing environment that may be custom to a particular enterprise. Using this information, the application may use with an artificial intelligence (AI) engine and/or big data mining application to produce a customized check and balance solution that would prevent custom and/or previously unknown malware from bypassing institutional controls. For example, a network environment scanning engine may utilize information that is unique to each enterprise to build a customized analysis platform to prevent malware from utilizing environment control checks to bypass an enterprise computing network's security measures.

FIG. 1 shows an illustrative computing environment 100 to secure a networked enterprise computing environment 102 by preventing unauthorized use of environment variables in the networked computing environment in accordance with one or more aspects described herein. For example, the computing environment may include multiple computing devices communicatively coupled via one or more computing networks (e.g., public network 105, private network 115, and the like). For example, one or more computing devices (e.g., computing device 132, computing device 134, computing device 136) of the enterprise computing network 102 may be communicatively coupled together via the private network 115 and to one or more computing devices external to the enterprise computing environment 102 (e.g., computing device 140). In some cases, a computing device 142 (e.g., a mobile computing device, a laptop, a mobile phone, and the like) may be capable of communicating via the private network 115 and/or the public network 105. In some cases, the secure enterprise computing environment 102 may include a computing device (e.g., a network environment control server 110) processing code to provide functionality of a network environment scanning engine 120 to protect the enterprise computing environment from malicious attempts to gain access to sensitive information. An illustrative example of the network environment scanning engine 120 may include a code analysis module 122, a data store 124, an alert module 126, and the like.

Environment variables are dynamic-named values that are used to affect how processes will execute in a computing environment. Running programs may access the values of environment variables for configuration purposes. These environment variables are part of the enterprise computing environment in which a process runs such that a running process may be able to query a value of a particular environment variable to discover an associated action. For example, an environment variable may be used to provide a suitable location to store temporary files, to find a directory structure associated with a user running the process, and the like. Since their introduction, environment variables have become ubiquitous in just about every operating system, although syntax, naming conventions, and/or use may differ between the different operating systems. In some cases, each process may have a corresponding set of environment variables, such that common features propagate from a parent process, for each subsequently created child process and custom features may be added such as through use of an application programming interface (API). In some cases, command shells may be used to change the environment variables, where shell scripts and/or batch files may utilize environment variables to communicate data and/or preferences to child processes, to store temporary values for reference later in a shell script, and the like. Environment variables may be initialized by initialization scripts as the operating system starts and, as such, may be inherited by other processes in the system. Initialization scripts may be augmented by a user, or used by a threat actor, for a particular command shell being used. In some cases, environment variables may cause vulnerabilities in a computing environment because certain programs (e.g., a Unix setuid program) may be assigned to an environment by a caller of the program, but it would run with a different authority than the caller. Such cases may cause security vulnerabilities because its caller may allow the program to run arbitrary code to set, unset, or otherwise changing environment variables to unknown values. Each operating system offers standardized formatting for environment variables, thus leaving them open for exploitation from threat actors.

In some cases, threat actors may continually seek to implement new attack vectors and/or may adapt current attack vectors in an attempt to keep ahead of security software capabilities. Threat actors may utilize common scripting languages such as to thwart signature-based detections. For example, a threat actor may utilize an obfuscated macro that uses process-level environment variables with a scripting language standard input command functionality to provide command line arguments in an attempt to gain entry. In some cases, the threat actor may attempt to disguise their intent by obfuscating environment variables by substituting characters with strings corresponding to other environment variables. Rather than decoding the obfuscation and/or attempting to match a known pattern of obfuscation, the network environment scanning engine may scan scripts or other code segments for environment variables and may analyze any found environment variables against environment variable unique to the enterprise computing network. For example, the network environment scanning engine 120 may include a code analysis module, a data store 124, and an alert module 126 to identify possible threats using environment variables to gain unauthorized access into the network computing environment 102 and generate an alert.

In some cases, the network environment scanning engine 120 may gather institutional computing information that is customized for the particular enterprise. For example, the network environment scanning engine may identify application information such as standardized build image data including path values, host naming conventions, domain names, and the like. Such information may be stored in the data store 124 and utilized by the code analysis module 122 utilizing one or more AI or Big Data analysis techniques to learn from past attacks and make system improvements for identifying data fields to acquire, store, search, and analyze, or to make other process or system improvements. Various machine learning and/or Big Data analysis algorithms may be used without departing from the scope of this disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning and/or Big Data learning algorithms may be used without departing from the invention. In some examples, the code analysis module 122 may analyze incoming information to identify which environment variables may be used in attempts to gain unauthorized access to the enterprise computing network. For example, the code analysis module 122 may analyze files and/or attachments received from an external source and to be received by an internal computing device (e.g., computing device 132), and attempting to gain access using what should otherwise have been an unknown environment variable to bypass external controls. In some cases, the Code analysis module may analyze environment variable change requests for unexpected changes such as into a different format, or at unexpected times, and/or by an unexpected application.

In some cases, threat actors may attempt to utilize known vulnerabilities in an operating system and/or application running on computing devices 130 of the enterprise computing environment 102. For example, the code analysis module 122 may analyze versioning information for operating system installations and/or application installations authorized for use in the enterprise computing environment. Using the versioning information, the code analysis module may identify vulnerabilities of the operating systems and/or installed applications known to the developers of those operating systems and/or applications. Such information may be provided in release notes or other documentation that may be captured and included in a knowledge base (e.g., a database stored in the data store 124) that may be used by the code analysis module 122 to continually adapt and learn potential vulnerabilities that may be used by threat actors via environment variables. Because developers continually update and adapt supported software and/or operating systems, such knowledge bases are continually updated with solutions to known problems being implemented and new vulnerabilities being identified. As such, dynamic adaptation by the code analysis module to changing conditions of the enterprise computing environment allows for better identification of use of known vulnerabilities by threat actors.

In some cases, the network environment scanning engine 120 may be a tool to combat malicious attempts to gain unauthorized access to the enterprise computing environment 102 by analyzing code or attachments that utilize environment variables to identify which environment variables are being utilized in a potential attach, details of each environment variable, and run a series of tests, such as via a machine learning algorithm and/or a big data analysis technique. For example, the network environment scanning engine may analyze any attachment or linked code that involves environment variables by analyzing code included in attached files, such as for macros, scripts, and the like. In some cases, the network environment scanning engine 120 may be customized for each enterprise computing environment 102 such as by identifying environment variables being used and identifying common formats used within the enterprise organization to minimize the code base for checks. The network environment scanning engine 120 may test different ways to breach into the network and may continually learn and adapt based on each successive analysis. The network environment scanning engine 120 may be able to identify a targeted attack, such as those focused on the specific enterprise network environment either from an outside threat actor and/or an inside attacker, by analyzing scripts to thwart an advanced threat actor that is trying, for example, to identify network identification information to bypass security measures, exploit known operating system vulnerabilities, and/or to identify when applications or scripts attempt to invoke functionality subject to the vulnerabilities. In some cases, the network environment scanning engine 120 may update a knowledge base in response to an software upgrade performed within the enterprise computing network (e.g., based on release notes for each OS/Application approved to run on the network). For example, an installation of a new version of an operating system, may trigger the network environment scanning engine 120 to update the knowledge base based on release notes associated with the installed version of the operating system. In some cases, the network environment scanning engine 120 may be used to augment antivirus and/or malware protections already in place.

Figure 2:
FIG. 2 shows an illustrative method to secure a computing environment by preventing unauthorized use of environment variables in accordance with one or more aspects described herein.
Figure 2:
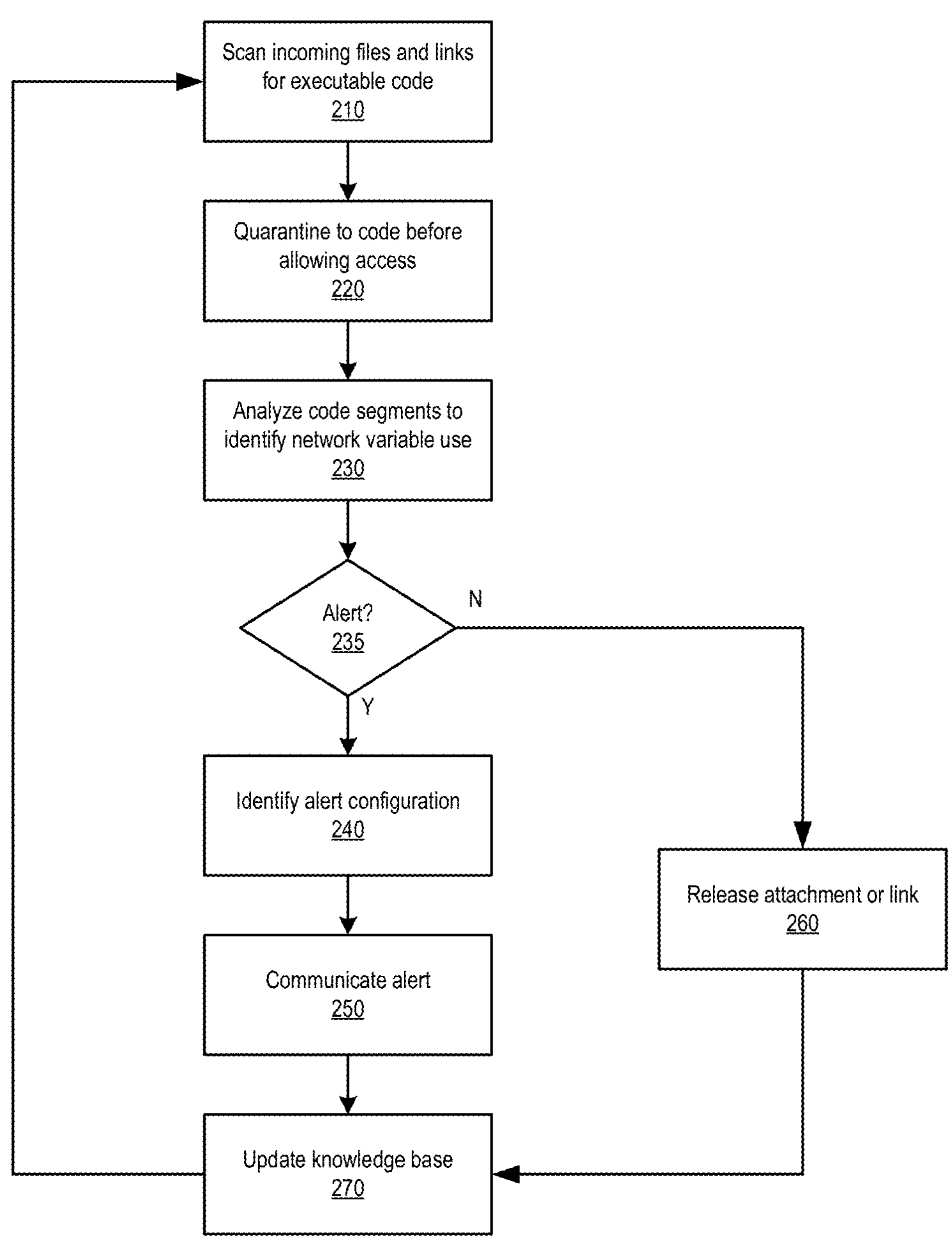

FIG. 2 shows an illustrative method to secure a computing environment by preventing unauthorized use of environment variables in accordance with one or more aspects described herein. At 210, the network environment scanning engine 120 may scan incoming file attachments and/or links for an indication of executable code. For example, the network environment scanning engine 120 may scan incoming emails and/or accessed web pages for indications of executable code or scripts. If such code is found, the network environment scanning engine 120 may quarantine the link or attachment for testing before allowing delivery to the intended recipient computing device (e.g., computing device 134) at 220.

At 230, the code analysis module 122 may analyze suspect code or scripts for use of environment variables, such as to utilize known vulnerabilities of operating systems and/or applications in use within the enterprise computing environment 102. For example, the code analysis module 122 may use one or more machine learning and/or big data analysis techniques to identify suspect use of environment variables, such as use of customized environment variables and/or formatting rules unique to the enterprise computing environment 102. If any suspect exploits are found, at 235, then the alert module 126 may format an alert identifying the possible intrusion attempt at 240. For example, the alert module 126 may trigger generation of alert communication to a system administrator, such as via a messaging system, an email system, a telecommunications system, an audio and/or visual display at a local machine and/or the like. Once configured the alert module 126 may communicate the alert via the identified media at 250. If, at 235, no suspect vulnerability exploits were identified, the attachment and/or link may be communicated to the destination computing device at 260. Whether an alert was sent at 250 or the attachment or link was allowed to be delivered at 260, the knowledge base stored in the data store 124 may be updated with the suspect information, environment variables that were identified, and/or whether an alert was to be generated at 270. the updated knowledge base may be used to improve a success rate as part of the AI or big data learning techniques. In some cases, at 270, the network environment scanning engine 120 may identify whether known vulnerabilities of the operating system or applications were used in an attempt to breach network security, were resolved or if any were newly introduced, where the information is stored in the data store 124 for use by the code analysis module.

Figure 3:
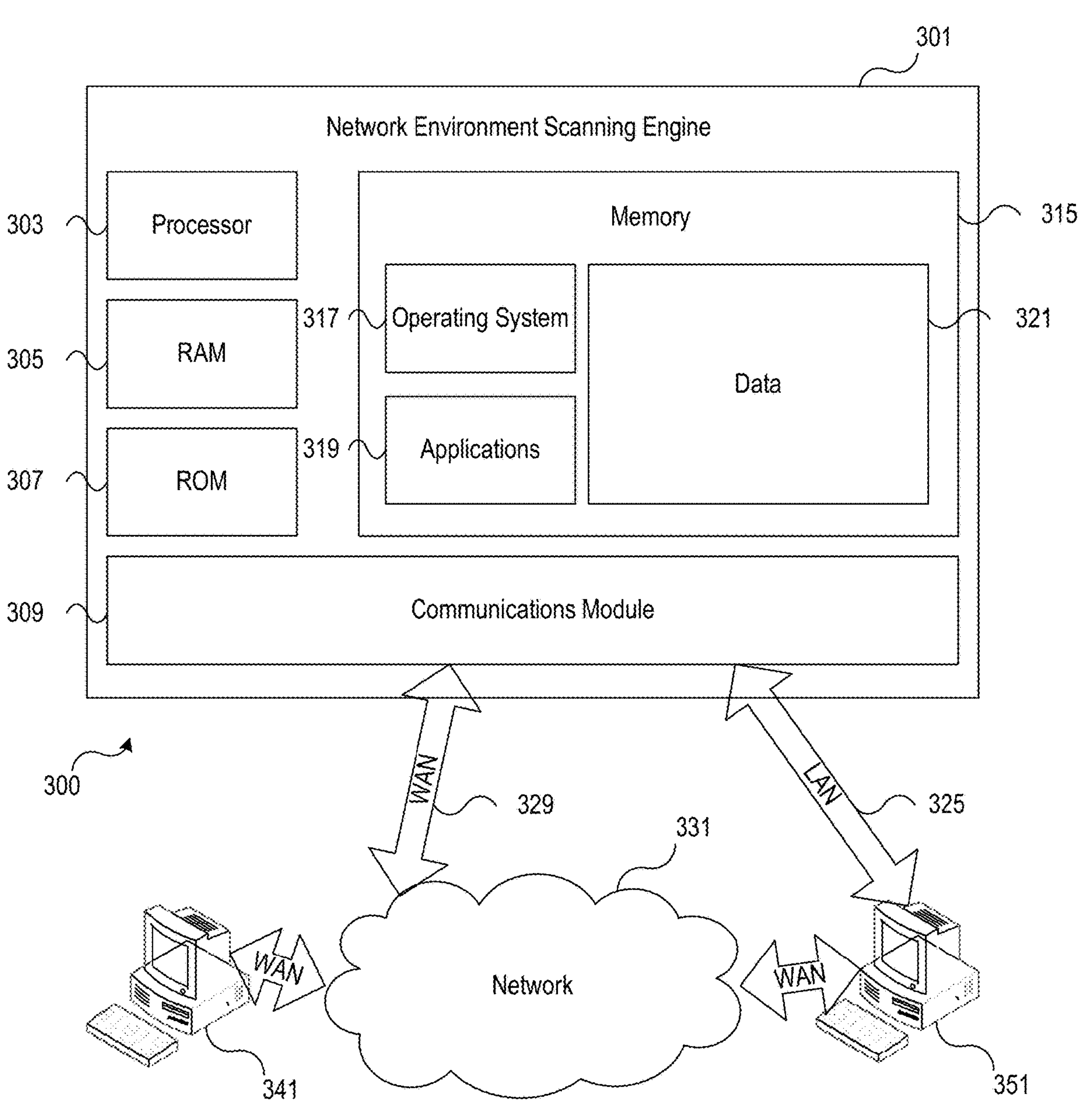
FIG. 3 shows an illustrative computing environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3 a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative network environment scanning engine 301 having a processor 303 for controlling overall operation of the network environment scanning engine 301 and its associated components, including a Random Access Memory (RAM) 305, a Read-Only Memory (ROM) 307, a communications module 309, and a memory 315. The network environment scanning engine 301 may include a variety of computer readable media. Computer readable media may be any available media that may be accessed by the network environment scanning engine 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the network environment scanning engine 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the network environment scanning engine 301. Such a processor may execute computer-executable instructions stored on a computer-readable medium.

Software may be stored within the memory 315 and/or other digital storage to provide instructions to the processor 303 for enabling the network environment scanning engine 301 to perform various functions as discussed herein. For example, the memory 315 may store software used by the network environment scanning engine 301, such as an operating system 317, one or more application programs 319, and/or an associated database 321. In addition, some or all of the computer executable instructions for the network environment scanning engine 301 may be embodied in hardware or firmware. Although not shown, the RAM 305 may include one or more applications representing the application data stored in the RAM 305 while the network environment scanning engine 301 is on and corresponding software applications (e.g., software tasks) are running on the network environment scanning engine 301.

The communications module 309 may include a microphone, a keypad, a touch screen, and/or a stylus through which a user of the network environment scanning engine 301 may provide input, and may include one or more of a speaker for providing audio output and a video display device for providing textual, audiovisual and/or graphical output. The computing system environment 300 may also include optical scanners (not shown).

The network environment scanning engine 301 may operate in a networked environment supporting connections to one or more remote computing devices, such as the computing devices 341 and 351. The computing devices 341 and 351 may be personal computing devices or servers that include any or all of the elements described above relative to the network environment scanning engine 301.

The network connections depicted in FIG. 3 may include a Local Area Network (LAN) 325 and/or a Wide Area Network (WAN) 329, as well as other networks. When used in a LAN networking environment, the network environment scanning engine 301 may be connected to the LAN 325 through a network interface or adapter in the communications module 309. When used in a WAN networking environment, the network environment scanning engine 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
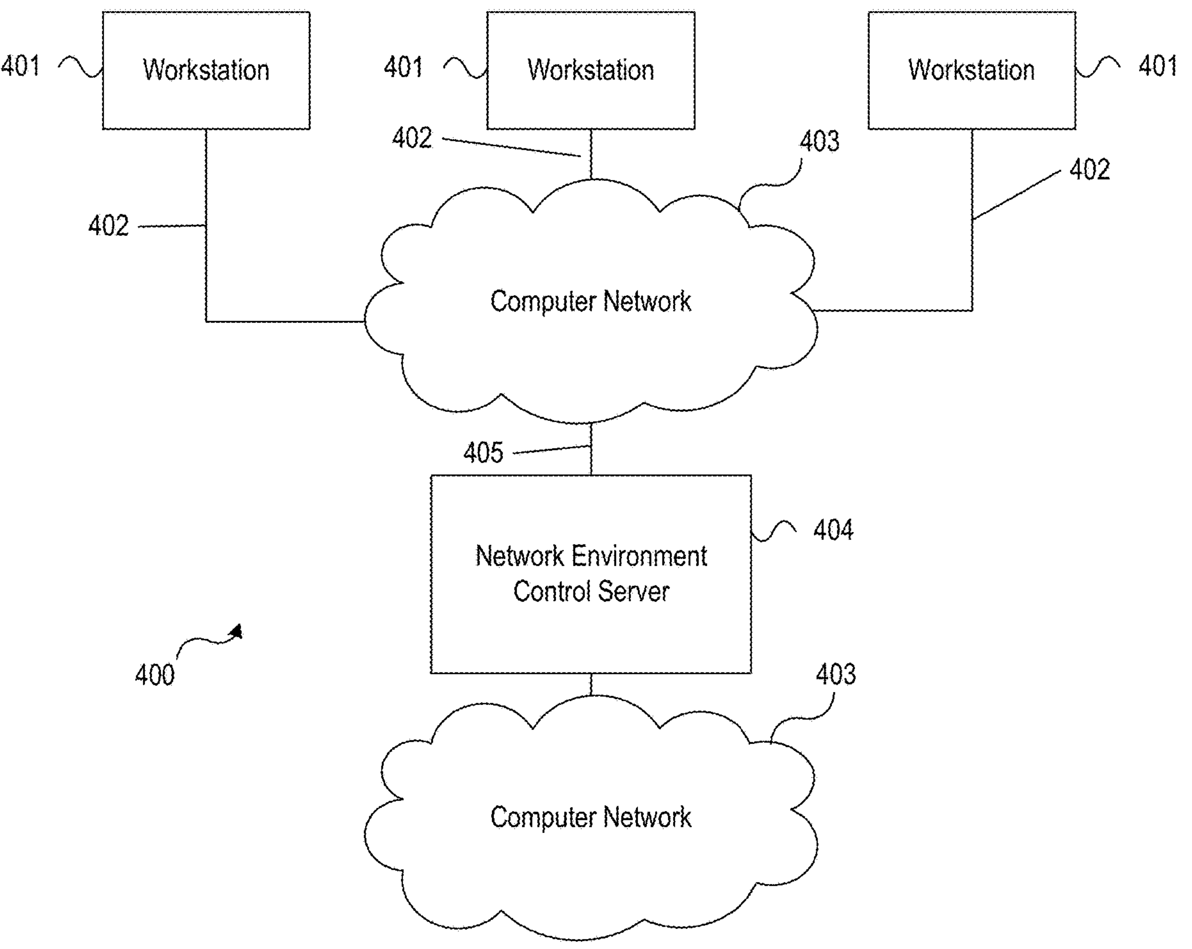
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to network environment control server 404. In the system 400, the network environment control server 404 may be a server, processor, computer, or data processing device, or combination of the same, configured to perform the functions and/or processes described herein. The network environment control server 404 may be used to secure a networked computing environment.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the network environment control server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method comprising:

gathering, by a machine learning based code analysis module, computing information associated with an enterprise computing network, wherein the computing information is unique to the enterprise computing network;

identifying, from a plurality of electronic messages received by an enterprise computing platform and by an information security platform, an incoming message comprising executable code targeting a known vulnerability of an operating system of a computing device identified as a recipient of the message;

analyzing, using a machine-learning based algorithm in a virtual security environment, the executable code to identify whether the executable code comprises one or more environment variables matching a format unique to an enterprise computing environment comprising an enterprise computing network, wherein formatting of the environment variables and formatting rules unique to the enterprise computing environment are unknown outside the enterprise computing environment;

matching, using the machine-learning based algorithm, the one or more environment variables to computing information customized and unique to the enterprise computing network;

identifying, based on inclusion of customized environment variables that are unique to the enterprise computing network, an attempt to bypass external controls by using environment variables unknown outside the enterprise computing environment; and triggering, based on identification of one or more environment variables that match the format unique to the enterprise computing network within the executable code, an electronic messaging system-based alert sent identifying an intrusion attempt using suspect use of the one or more environment variables to bypassing security measures of the enterprise computing network.

2. The method of claim 1, further comprising quarantining the electronic message in the virtual security environment immediately upon receipt of the electronic message at a communication interface of the enterprise computing platform.

3. The method of claim 1, wherein identifying an incoming electronic message comprising executable code comprises analyzing an attachment to the electronic message for text patterns corresponding to a scripting language.

4. The method of claim 1, wherein the computing information unique to the enterprise computing network comprises a path value, a naming convention, or a domain name and unknown outside the enterprise computing network.

5. The method of claim 1 comprising receiving, via a communication interface of the enterprise computing platform, the plurality of electronic messages from a computing device outside the enterprise computing network.

6. A system comprising:

an enterprise computing system comprising a communication interface communicatively connected to an external communication network, wherein a plurality of electronic messages are received via the communication interface;

a computing platform comprising:

a processor; and non-transitory computer readable medium storing computer-executable instructions that, when executed by the processor, cause the computing platform to:

gather, by a machine learning based code analysis module, computing information associated with the enterprise computing network, wherein the computing information is unique to the enterprise computing network;

identify, from a plurality of electronic messages received by an enterprise computing platform, an incoming message comprising executable code targeting a known vulnerability of an operating system of a computing device identified as a recipient of the message;

analyze, using a machine-learning based algorithm in a virtual security environment, the executable code to identify whether the executable code comprises one or more environment variables matching a format unique to an enterprise computing environment comprising an enterprise computing network, wherein formatting environment variables and formatting rules unique to the enterprise computing environment are unknown outside the enterprise computing environment;

match, using the machine-learning based algorithm, the one or more environment variables to computing information customized and unique to the enterprise computing network;

identify, based on inclusion of customized environment variables that are unique to the enterprise computing network, an attempt to bypass external controls by using environment variables unknown outside the enterprise computing environment; and send, based on identification of one or more environment variables that match the format unique to the enterprise computing network within the executable code, an electronic messaging system-based alert sent identifying an intrusion attempt using suspect use of the one or more environment variables to bypassing security measures of the enterprise computing network.

7. The system of claim 6, wherein the instructions further cause the computing platform to quarantine of the electronic message in the virtual security environment immediately upon receipt of the electronic message at the communication interface.

8. The system of claim 6, wherein the instructions further cause the computing platform to identify an incoming electronic message comprising executable code by analyzing an attachment to the electronic message for text patterns corresponding to a scripting language.

9. The system of claim 6, wherein the information unique to the enterprise computing network comprises a path value, a naming convention, or a domain name.

10. A computing device securing access to an enterprise computing network, comprising:

a processor;

non-transitory computer-readable media storing computer-executable instructions that, when executed by the processor, cause the computing device to:

gather, by a machine learning based code analysis module, computing information associated with the enterprise computing network, wherein the computing information is unique to the enterprise computing network;

identify, from a plurality of electronic messages received by an enterprise computing platform, an incoming message comprising executable code targeting a known vulnerability of an operating system of the computing device identified as a recipient of the message;

analyze, using a machine-learning based algorithm in a virtual security environment, the executable code to identify whether the executable code comprises one or more environment variables matching a format unique to an enterprise computing environment comprising an enterprise computing network, wherein formatting environment variables and formatting rules unique to the enterprise computing environment are unknown outside the enterprise computing environment;

match, using the machine-learning based algorithm, the one or more environment variables to computing information customized and unique to the enterprise computing network;

identify, based on inclusion of customized environment variables that are unique to the enterprise computing network, an attempt to bypass external controls by using environment variables unknown outside the enterprise computing environment; and send, based on identification of one or more environment variables that match the format unique to the enterprise computing network within the executable code, an electronic messaging system-based alert sent identifying an intrusion attempt using suspect use of the one or more environment variables to bypassing security measures of the enterprise computing network.

11. The computing device of claim 10, wherein the instructions further cause the computing device to quarantine of the electronic message in the virtual security environment immediately upon receipt of the electronic message at a communication interface.

12. The computing device of claim 10, wherein the instructions further cause the computing device to identify an incoming electronic message comprising executable code by analyzing an attachment to the electronic message for text patterns corresponding to a scripting language.

13. The computing device of claim 10, wherein the information unique to the enterprise computing network comprises a path value, a naming convention, or a domain name.

14. The computing device of claim 10, wherein the alert is sent based on information stored in a knowledge base and is associated with a particular environment variable.

* * * * *